Figure 1:
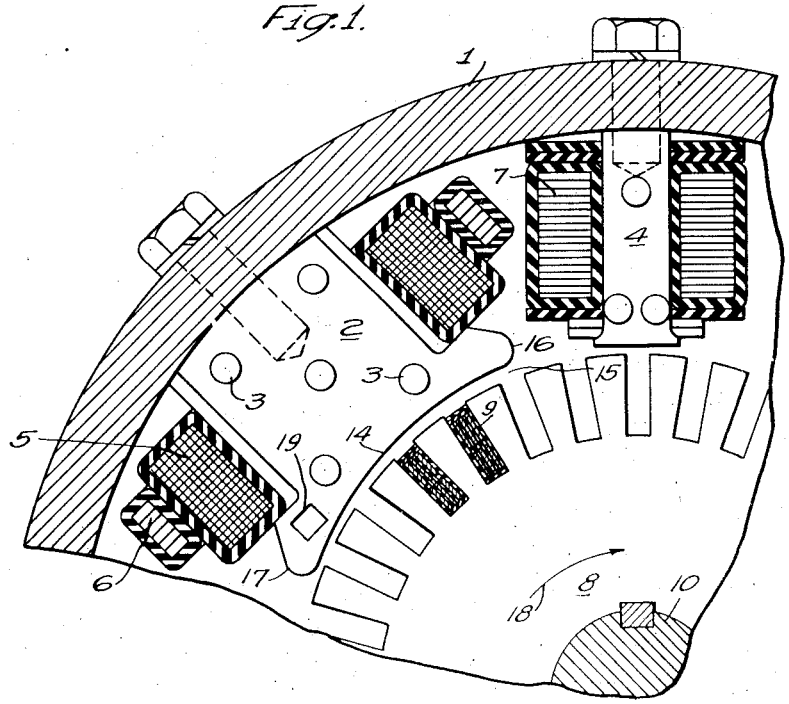

Feb. 5, 1946.  A. W. KIMBALL  2,394,075

GENERATOR AND POWER PLANT THEREFOR

Filed Feb. 26, 1941

WITNESSES:

INVENTOR
Albert W. Kimball.
BY
ATTORNEY

Patented Feb. 5, 1946

2,394,075

UNITED STATES PATENT OFFICE 2,394,075

GENERATOR AND POWER PLANT THEREFOR

Albert W. Kimball, Forest Hills, Pa., assignor to Westinghouse Electric Corporation, East Pittsburgh, Pa., a corporation of Pennsylvania Application February 26, 1941, Serial No. 380,652

6 Claims. (Cl. 171—227)

My present invention relates to a self-regulating direct-current commutator-type generator having special design-features so as to obtain special characteristics as will be subsequently described.

This invention is a modification of the special generator and power plant which was described and claimed in my prior application Serial No. 331,745, filed April 26, 1940, patented March 18, 1941, Patent No. 2,235,075, the present modifications being made for the purpose of securing somewhat different characteristics.

The principal object of my invention is to provide a high-voltage direct-current generator which is particularly adapted for supplying the plate-circuit power for radio-transmitters. It is required that the generator shall be operable both at full voltage and at approximately half-voltage, and that it shall have acceptable voltage-regulation at both voltages. During full-voltage operation, it is required that the output-voltage of the generator shall drop from minimum load to full load, but that this drop shall not be more than 5%, and this requirement must be satisfied regardless of the different drooping speed-characteristics of several different motors or other prime movers, any one of which may be utilized to drive the generator, according to local requirements. During half-voltage operation, it would be permissible, even desirable, for the output-voltage of the generator to have a somewhat drooping characteristic, but because of electrical design-limitations a rising characteristic is usually obtained, and a 10% rise in voltage, from minimum load to full load, is altogether satisfactory.

It is a further requirement of radio-generators of the present type, that they shall have a minimum amount of series field-winding ampere-turns, in order to avoid difficulties due to a possible resonant condition in the radio-transmitter when operating under certain keying or phonic load-frequencies, so as to avoid a periodic voltage-change in the generator or frequency-variation in the radio-transmitter.

A minimum series field is also desirable in order to enable the generator to withstand a further requirement, namely that it shall be capable of withstanding consecutive short-circuits of two seconds duration at one minute intervals, and that it shall restore itself to normal voltage within the one minute intervals. A minimum amount of series field is desirable, under these conditions, in order to minimize the generated-voltage and the short-circuit current during the short-circuit condition.

An object of my invention is to produce a generator having tapered air gaps under the main poles, and saturated and unsaturated pole-tips, as described in my previous application, except that, in my present design, the unsaturated tip does not become saturated, during full-voltage operation, until after the full load is reached, and furthermore, the saturated tip and tapered air gap are so proportioned that there is little or no saturation during half-voltage operation, so that normal armature-distortion will be effective to rather considerably reduce the rising slope of the voltage-regulation curve from minimum load to full load during said half-voltage operation. My present design also utilizes a weaker series field than my previous design, so that this reduced series field works jointly with the increased armature-distortion, during half-voltage operation, to very materially reduce the voltage-rise from minimum load to full load during said half-voltage operation.

Figure 4:
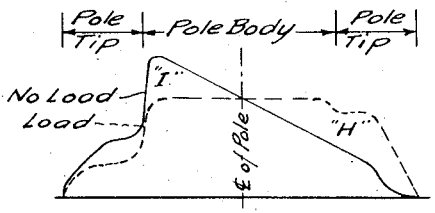
Figure 5:
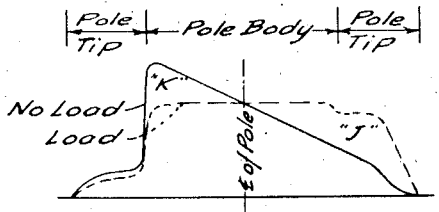
Figure 6:
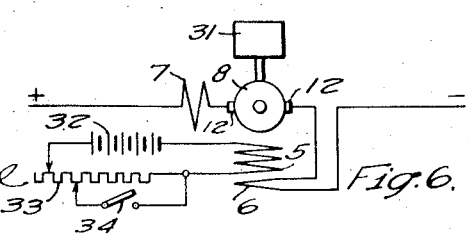

With the foregoing and other objects in view, my invention consists in the apparatus, combinations, circuits, systems and methods hereinafter described and claimed, and illustrated in the accompanying drawing, wherein Figure 1 is a fragmentary transverse sectional view through a generator embodying my invention, Figs. 2, 3, 4 and 5 are explanatory diagrams which will be referred to in the explanation of the special design-features relating to the main pole-pieces of the generator, and Fig. 6 is a diagrammatic view of the power-plant, and of the circuit-connections of the generator.

As shown in Fig. 1, the illustrative form of embodiment of my generator comprises a stator-member or field member, comprising an outer frame-ring or yoke-member 1 of magnetizable material such as a rolled slab of steel, four main pole-pieces 2 of magnetizable material, such as sheet-steel laminations which are held together by rivets 3, and four interpole-pieces 4 which are also of magnetizable material which may be similar to the material of which the main pole-pieces 2 are constructed. In some instances, a two-pole construction, or any other than four-pole construction, may be preferred. Each of the main pole-pieces 2 carries a shunt field-winding or exciting-coil 5 and a cumulative series coil 6, while each of the interpole-pieces carries a series-connected commutating or interpole-coil 7.

The generator is also provided with a commutator-type rotor-member comprising a slotted magnetizable armature-core 8 carrying armature-windings 9 and mounted upon a shaft 10. In common with the other commutator-type direct-current generators, and as diagrammatically indicated in Fig. 6, the armature-windings 9 are connected to a commutator which is diagrammatically represented, in Fig. 6, as the surface of the armature 8, current being conducted to and from the commutator by means of brushes 12.

As explained in my previously filed application, special design-features are embodied in the main pole-pieces 2; and these design-features have been somewhat modified in my present invention.

Each main pole-piece 2 is provided with a pole-face portion or surface 14 which is spaced, from the armature-core 8, by an air gap which, in accordance with my present invention, is tapered, as indicated at 15. Each main pole-piece 2 is also provided with a first pole-face tip 16 in which the armature reaction produces a cumulative magnetomotive force, and a second pole-face tip 17 in which the armature reaction produces a differential magnetomotive force. This corresponds to a certain predetermined direction of rotation of the armature, as indicated by the arrow 18 in Fig. 1.

The large end of the tapered air gap 15 under each of the main pole-pieces 2, is under the first-mentioned, or cumulative-flux, pole-face 16. Also, the first-mentioned or cumulative-flux tip 16 is of an unusually large sectional area, as compared to the more common generator-designs, so as to have sufficient cross-section, in radial planes, to be substantially unsaturated for less than full-load currents, during full-voltage operation, becoming saturated after full load is reached.

The second-mentioned, or differential-flux, pole-tip 17 is specially designed so that, when the shunt field 5 is fully excited, as during full-voltage operation of the generator, said pole-tip 17 will be substantially saturated, during no-load or minimum-load conditions, and even beyond full-load currents, where the demagnetizing armature reaction in said pole-tip is very considerable. In order to make the differential-flux pole-tip 17 saturate under full-excitation conditions, its effective cross-sections must be reduced or restricted, by any suitable means, such as providing a hole 19 therein, as shown in Fig. 1, or by any equivalent means for reducing the effective cross-section of the magnetizable material which carries flux in a circumferential direction in said pole-tip 17.

In my present design, the interpole-piece 4 is of standard design, adapted to carry the commutating flux produced by the interpole-coil 7.

The effect of my special design-features in connection with the main pole-piece 2 can be most readily understood by a study of the resulting field-forms. Thus, in Fig. 2, I have shown, in the solid-line curve 23, the full-voltage no-load field-form of the flux under a main pole-piece of a machine having a uniform air gap and normal pole-tips which are fairly close to the saturation-point when there is no armature-reaction. When load comes on, I have assumed an armature-design and direction of rotation such as to have the armature-reaction produce a cumulative magnetomotive force on the right-hand side of the pole, and a differential magnetomotive force on the left-hand side of the pole, as indicated by the dotted-line curve indicated at 24 in Fig. 2. It will be noted that the right-hand tip saturates, so that there is very little increase in flux in it, as indicated by the area "D," whereas there is a considerable decrease in the magnitude of the flux carried by the left-hand pole tip, as indicated by the area "E." The over-all effect is a reduction in the flux carried by the pole-piece under load-conditions.

Figure 3:
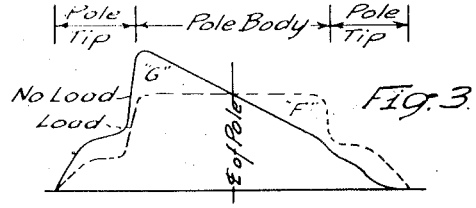

Fig. 3 shows similar curves for a machine having a tapered air gap such as mine, but having normal pole-tips. Since the large air gap under the right-hand tip reduces the flux carried thereby, there is less saturation under no-load conditions. However, there is some saturation of the right-hand tip under load, with the result that the effect of the armature reaction is to decrease the flux carried by the main pole-piece, as indicated by the area "G" being larger than the area "F."

In Fig. 4, I show the effect of increasing the cross-section of the right-hand pole-tip, while retaining the tapered air gap and the normal design of the left-hand pole-tip. In this case, the result of the armature reaction, during full-voltage operation, is to produce little, if any, change in the total flux carried by the main pole-piece, the two areas "H" and "I" being approximately equal. There may possibly be a slight increase in the flux under load conditions. This applies to load-conditions which do not produce any substantial saturation in the right-hand pole-tip 16, including loads up to and beyond full-load, in my present generator, as compared to loads only up to 60% of full-load in the generator shown in my Patent No. 2,235,075.

In Fig. 5, I show the effect of reducing the section of the left-hand pole-tip so as to cause it to be saturated, even under full-load-conditions, during full-voltage operation, while retaining the previously described unsaturated design of the right-hand pole-tip and the tapered air-gap. The full-load-conditions herein referred to are the same 100% load-conditions which brought the cumulative-flux tip 16 nearly up to a saturated condition. In Fig. 5, it will be easy to see that the saturated condition of the left-hand pole-tip prevents the armature-reaction from reducing the flux as much as was previously the case, at the left-hand end of the pole-piece, as indicated by the small size of the area "K," while the unsaturated condition of the right-hand pole-tip permits a considerable increase in the flux passing through the right-hand half of the pole-piece, with the result that there is a definite increase in the useful exciting-flux of the machine, as a result of armature-reaction, with increasing loads, during the aforesaid full-voltage excitation-conditions, as shown by the preponderent size of the area "J."

When the shunt-field excitation is reduced, as during the half-voltage operation of the generator, the resultant flux-densities in the saturated tip 17 are such that there is substantially no saturation in this tip at no-load or minimum-load operation. In this manner, at full-load half-voltage operation, approximately normal, or greater-than-normal, flux-reduction, or even a flux-reversal, due to armature-reaction, is produced at this pole-tip; and I have been able to obtain an approximately flat voltage-regulation from no-load, or minimum-load, to full load (for the half-voltage condition), when operating at the half-voltage adjustment of the field-winding excitation.

Figure 2:
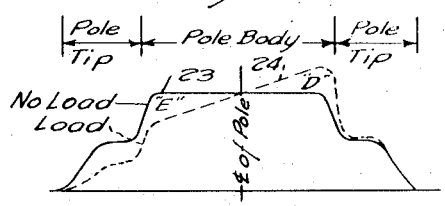

The operation of my improved machine, as a result of the previously described design-characteristics, will now be explained. At full-voltage operation, it will be recalled that the cumulative-flux pole-tip 16 is substantially unsaturated, for all currents up to full-load currents, while the differential-flux pole-tip 17 is substantially saturated for all of these current-conditions including full-load current, when the demagnetizing, or differentially acting, armature-reaction is at its maximum. Hence, as the load changes, during this full-voltage operation, the effect of the demagnetizing portion of the armature reaction is very small, because it operates on a saturated pole-tip, while the effect of the cumulative portion of the armature reaction is quite large, because it operates on a pole-tip which is not substantially saturated, thus producing an increase in the effective flux, as the load increases from no-load to full-load. This utilization of the armature-reaction to increase the effective flux in the main poles, as the load comes on, is thus effective in counteracting the effects of the resistance-drop in the generator, and the speed-droop in the prime-mover, as the load comes on, thus making it possible to materially flatten the voltage-characteristic, from no-load to full-load, during this full-voltage operation, with substantially less than normal series-field ampere-turns. The significance of this operation will be better understood, when it is noted that, in a normal machine, as depicted in Fig. 2, the flux-changing effect of the cumulative portion of the armature reaction, as indicated by the right-hand pole-tip, is relatively small, because of the unsaturation of the cumulative-flux pole-tip under load-conditions, while the effect of the differential or bucking-portion of the armature-reaction is quite large, because of the unsaturated condition of the left-hand pole-tip, so that the effect of the armature reaction, in a standard machine, is to reduce the field-flux, instead of increasing it, as I have done, as the load changes from no-load to full-load.

Under half-voltage operation, the conditions are different, because the differential-flux pole-tip 17 now no longer saturates, under any operating load-conditions, at this half-voltage. My machine, under the half-voltage operating conditions, is more nearly like a standard machine, operated at half-voltage, except that my tapered air-gap augments the flux-reducing effect of the armature-reaction under the maximum load-conditions which are encountered during this half-voltage operation. Thus, during the half-voltage operation of my machine, there would be substantially no saturation in either pole-tip, so that the magnetizing and demagnetizing portions of the armature reaction are not affected by saturation. However, the tapering of the air gap relatively reduces the flux obtained by the cumulative or magnetizing portion of the armature reaction, while it relatively increases the effect of the demagnetizing flux obtained by reason of the demagnetizing armature-reaction in the other pole-tip. This results in a greater decrease in the flux due to armature reaction than would be obtained in a normal type generator. My change, therefore, from a saturated to an unsaturated differential-flux pole-tip, when changing from full-voltage to half-voltage operation, thus results in a difference in the armature-reaction effect which I obtain under the two different voltage-conditions, making it possible for me to advantageously control the voltage-characteristic which is inherently obtained in the machine without any voltage-regulators, during these two different operating-voltage conditions.

To appreciate the advantages which I have obtained by the effects just described, it should be realized that a normal machine which has sufficient series-field ampere-turns to obtain a voltage-regulation as good as only a 5% drop in voltage, from no-load to full-load, would have, at half-voltage, a very great over-abundance of series-field ampere-turns, because, under full-voltage operating-conditions, the series-field ampere-turns must be sufficient to produce a certain amount of flux-increment at a portion of the saturation-curve where it takes a relatively large number of ampere-turns to increase the flux by a predetermined amount, whereas, under the half-voltage operating-conditions, the same amount of ampere-turns, added at a lower point on the saturation-curve, would produce a very much greater increase in the flux. Thus, a standard machine which had a 5% drooping characteristic, under normal voltage conditions, might have as much as a 50% increase in voltage, from no-load to full-load, under half-voltage excitation, even though the full-load current, at half-voltage, were only one-half as large as the full-load current during full-voltage conditions. In my improved machine, this excessive amount of overcompensation is avoided by first designing the machine so as to require a smaller than normal amount of series-field ampere-turns under the full-voltage operating-conditions, and second, designing the machine so that the differential-flux pole-tip changes from a saturated to an unsaturated condition, and utilizing a tapered air-gap machine, in changing from full-voltage to half-voltage, thus augmenting the demagnetizing effect of the armature-reaction during the half-voltage conditions. By these means, I am easily enabled to obtain a voltage-regulation which has only a 10% rise in voltage, from no-load to full-load, under the half-voltage operating-conditions, and the regulation can obviously be still further improved by carrying the design-principles still further, along the lines already described.

Furthermore, it will be noted that I have accomplished the foregoing results with a minimum number of turns of the series winding 6, using only enough series field to compensate for the speed-change and the IR drop, less the desired voltage-drop during full-voltage operation, as distinguished from the conditions in my patented generator, wherein enough series field was utilized to produce no voltage-drop at all, up to the previously mentioned 60% load. I thus avoid radio-difficulties which might result from too much series field-strength, and I also enable the generator more successfully to withstand momentary short-circuits.

Comparing my present radio-generator with the searchlight-generator of my Patent No. 2,235,075, it will be noted that, aside from such matters as the choice of voltage and kilowatt-rating, several important changes have been introduced, which will be discussed under the headings A, B, C and D.

A. My cumulative-flux tip 16 is larger, in radial thickness, or cross-sectional area with respect to the circumferentially flowing flux therein, so that it remains substantially unsaturated, even during the heaviest cumulative armature-reaction conditions, which occur, of course, at the highest load to which the generator will be subjected, this pole-tip becoming saturated only after full-load is reached; whereas the corresponding part of my patented searchlight-generator became saturated at about 60% load, or in the range between 40% and 60% load, more or less. The effect of saturation, in this pole-tip 16, is to decrease the cumulative part of the armature-reaction, thus causing a droop in the voltage-regulation of the generator.

B. My differential-flux tip 17 is, or may be, also larger, so that it is operated at a lower degree of saturation, at no-load, full-voltage, than the corresponding part in my searchlight-generator. In both cases, this pole tip 17 is well saturated at no-load, when the effective demagnetizing armature-reaction ampere-turns are zero or a minimum; but in my patented searchlight-generator the degree of over-saturation, beyond the knee of the saturation-curve, would, in general, be greater, because this pole-tip should obviously remain fairly well saturated, even under the maximum effective demagnetizing armature-ampere-turn conditions, when the maximum load is on the generator, unless an extremely heavy voltage-droop is required, for loads beyond the value called 60% in the patent. If this 60% load-condition of my patented searchlight-generator is regarded as corresponding to the 100% load-condition of my present radio-generator, so that the other pole-tip 16 will not be saturated at 100% load, then the previous 100% rating of the patented generator will become the equivalent of a 167% rating on the new basis. My new generator needs to be designed with only enough over-excitation, on the field-windings, so that the differential-flux tip 17 will be operating at about, or a little above, the knee of its saturation-curve at the same load which will bring the cumulative-flux tip 16 almost up to the knee of its saturation-curve; whereas my patented generator should, in general, have enough restriction in its differential-flux tip 17 so that the maximum load, with 167% armature-reaction, will not bring its magnetization too far down below the knee of its saturation-curve, which would defeat the purpose of the saturating design, and produce a sharply drooping voltage-characteristic at loads which unsaturate this pole-tip 17. It is easy to see that, because my new machine is not designed to handle 167% loads, the relative design-relationships of the cumulative and differential-flux pole-tips 16 and 17 are different, in the two machines.

C. My present cumulative series field-winding 6 is also different from the one in my former generator, my present one being the weaker. The effect of the series winding is to make the voltage-characteristic of the machine less drooping, or more rising. It is used to counteract the markedly drooping characteristic of an uncompounded shunt-machine. In the case of the patented generator, enough series-winding turns were utilized to compensate for substantially all of the drooping tendency of the machine, resulting in a substantially flat voltage-characteristic up to 60% load, after which certain saturation-effects, principally in the cumulative-flux pole-tip 16, would bring down the voltage into a progressively drooping characteristic. In my present generator, I use not quite enough series field to compensate for the drooping speed-characteristic of the prime-mover and the IR drop in the generator itself, leaving a certain uncompensated amount of droop in the voltage-characteristic, from no-load up to the full-load, or up to the load at which the cumulative part of the armature-reaction nearly saturates the tip 16, and at which the differential part of the armature-reaction nearly unsaturates the tip 17. This drooping voltage-characteristic avoids difficulties in connection with the radio-apparatus which is energized from my present generator, it also reduces the short-circuit current of the generator, and it also makes a slight, but sorely needed, improvement in the rising tendencies of the voltage-characteristic at half-voltage operation.

D. The requirement for operation at half-voltage, in the case of my new generator, gives additional point and significance to the changes which have been introduced in the pole-tip sections, and in the series-winding strength. Counting the load which almost saturates the cumulative-flux tip 16 as 100% load, my former design requires, in the differential-flux tip 17, at full-voltage, an amount of excess field-ampere-turns, if not equal to, at least approaching, or affected by, the armature-reaction ampere-turns corresponding to 167% load, over and above the amount of field-ampere-turns necessary to bring the tip 17 up to a point just beyond the knee of its saturation-curve. Thus, the tip 17 operates (at full-voltage) well above the knee of its saturation-curve, where a larger increase in ampere-turns means only a small increase in flux or voltage, but nevertheless, if the operating-point is too far beyond the knee of the saturation-curve, the flux under full-voltage operating-conditions might still be twice the value of the flux in the vicinity of the knee; so that, when half-voltage operation is required, the tip 17 might still be saturated at no-load. In my new generator, by starting out with less excess-saturation under full-voltage excitation, half-voltage excitation will bring my tip 17 well below the knee of its saturation-curve, and hence I secure a much greater strengthening of the demagnetizing part of the armature-reaction during half-voltage operation, which means that I make use of the demagnetizing part of the armature-reaction to reduce the total flux, and hence the voltage, thus materially compensating the excessive rising-tendency which is a common ailment of partially excited generators in general. My reduction in the series-field is another move in the same direction, as the effect of the series-field is to boost, or give a rising characteristic to, the voltage-characteristic of the machine. By these expedients, I am enabled to produce a generator having an inherent regulation which is acceptable, both at full-voltage operation and at half-voltage operation.

Fig. 6 shows the general combinations and connections of a power-plant including a generator, as above described, and an electric motor or other prime-mover 31, which will preferably have a slightly drooping, speed-characteristic with increased loads, or it may have different speed-torque requirements at different times, as when direct-current and alternating-current motors are used interchangeably for one another, according to the necessities of the available power-supply (not shown). The two generator-terminal-leads are indicated at (+) and (−). The main generator-circuit may be traced from the positive lead (+), through the commutating coil 7, the armature 8 and the series field-coil 6, to the negative lead (−). The shunt coil 5 is illustrated as being separately excited from any suitable direct-current source, such as a battery 32. The exciting current may be regulated by a variable resistor 33, a large block of which may be shunted by a switch 34 in changing from half-voltage to full-voltage operation. The series exciting coil 6 is connected so as to produce cumulative compounding in an amount which is approximately correct to compensate for the IR drop due to the resistance of the main circuit of the generator, and also to compensate for the slight droop in the speed-characteristic of the prime-mover 31.

While I have illustrated my invention in a preferred form of embodiment, I wish it to be understood that various changes of omission, substitution or addition may be made by the skilled workers of the art without departing from some of the essential broader features of my invention. I desire, therefore, that the appended claims shall be accorded the broadest construction consistent with their language.

I claim as my invention:

1. A self-regulating direct-current commutator-type generator comprising: a field member comprising a yoke member, and a plurality of main pole-pieces; a rotor member comprising an armature core separated from the main pole-pieces by air gaps; shunt coils for exciting the main pole-pieces; and means for exciting the shunt coils so as to produce, at times, excitation for approximately full-voltage operation, and at other times excitation for approximately half-voltage operation; each main pole-piece having a pole-face with a tapered air gap, and each main pole-piece having a first pole-face tip in which the armature reaction produces a cumulative magneto-motive force and a second pole-face tip in which the armature reaction produces a differential magnetomotive force; the large end of the tapered air gap being at the first tip; the first tip being of sufficient cross-section to be substantially unsaturated for all currents up to full-load-currents at excitation for approximately full-voltage operation; and the second tip being of such restricted cross-section as to be substantially saturated for all currents up to beyond full-load-currents when the shunt coils are excited at excitation for approximately full-voltage operation, but being substantially unsaturated at excitation for approximately half-voltage operation, whereby the generator has a drooping voltage-characteristic substantially throughout the range from no-load to full-load during excitation for substantially full-voltage operation, and whereby the rising tendency of the voltage-characteristic at half-voltage operation is limited.

2. A self-regulating direct-current commutator-type generator comprising: a field member comprising a yoke member, a plurality of main pole-pieces and a plurality of interpole-pieces; a rotor member comprising an armature core separated from the main pole-pieces and interpole-pieces by air gaps; shunt coils for exciting the main pole-pieces; series-connected interpole-coils for exciting the interpole-pieces; and means for exciting the shunt coils so as to produce, at times, excitation for approximately full-voltage operation, and at other times excitation for approximately half-voltage operation; each main pole-piece having a pole-face with a tapered air gap, and each main pole-piece having a first pole-face tip in which the armature reaction produces a cumulative magneto-motive force and a second pole-face tip in which the armature reaction produces a differential magnetomotive force; the large end of the tapered air gap being at the first tip; the first tip being of sufficient cross-section to be substantially unsaturated for all currents up to full-load-currents at excitation for approximately full-voltage operation; and the second tip being of such restricted cross-section as to be substantially saturated for all currents up to beyond full-load-currents when the shunt coils are excited at excitation for approximately full-voltage operation, but being substantially unsaturated at excitation for approximately half-voltage operation, whereby the generator has a drooping voltage-characteristic substantially throughout the range from no-load to full-load during excitation for substantially full-voltage operation, and whereby the rising tendency of the voltage-characteristic at half-voltage operation is limited.

3. A self-regulating direct-current commutator-type generator comprising: a field member comprising a yoke member, and a plurality of main pole-pieces; a rotor member, comprising an armature core separated from the main pole-pieces by air gaps; shunt coils and cumulative series coils for exciting the main pole-pieces; and separate-excitation means for exciting the shunt coils so as to produce, at times, excitation for approximately full-voltage operation, and at other times excitation for approximately half-voltage operation; each main pole-piece having a pole-face with a tapered air gap, and each main pole-piece having a first pole-face tip in which the armature reaction produces a cumulative magnetmotive force and a second pole-face tip in which the armature reaction produces a differential magnetomotive force; the large end of the tapered air gap being at the first tip; the first tip being of sufficient cross-section to be substantially unsaturated for all currents up to full-load-currents at excitation for approximately full-voltage operation; and the second tip being of such restricted cross-section as to be substantially saturated for all currents up to beyond full-load-currents when the shunt coils are excited at excitation for approximately full-voltage operation, but being substantially unsaturated at excitation for approximately half-voltage operation, whereby the generator has a drooping voltage-characteristic substantially throughout the range from no-load to full-load during excitation for substantially full-voltage operation, and whereby the rising tendency of the voltage-characteristic at half-voltage operation is limited.

4. A self-regulating direct-current commutator-type generator comprising: a field member comprising a yoke member, a plurality of main pole-pieces and a plurality of interpole-pieces; a rotor member comprising an armature core separated from the main pole-pieces and interpole-pieces by air gaps; shunt coils and cumulative series coils for exciting the main pole-pieces; series-connected interpole-coils for exciting the interpole-pieces; means for exciting the shunt coils so as to produce, at times, excitation for approximately full-voltage operation, and at other times excitation for approximately half-voltage operation; each main pole-piece having a pole-face with a tapered air gap, and each main pole-piece having a first pole-face tip in which the armature reaction produces a cumulative magnetomotive force and a second pole-face tip in which the armature reaction produces a differential magnetomotive force; the large end of the tapered air gap being at the first tip; the first tip being of sufficient cross-section to be substantially unsaturated for all currents up to full-load-currents at excitation for approximately full-voltage operation; and the second tip being of such restricted cross-section as to be substantially saturated for all currents up to beyond full-load-currents when the shunt coils are excited at excitation for approximately full-voltage operation, but being substantially unsaturated at excitation for approximately half-voltage operation, whereby the generator has a drooping voltage-characteristic substantially throughout the range from no-load to full-load during excitation for substantially full-voltage operation, and whereby the rising tendency of the voltage-characteristic at half-voltage operation is limited.

5. A power-plant comprising: a prime-mover having a slightly drooping speed-characteristic with increasing loads; and a self-regulating direct-current commutator-type generator; said generator comprising: a field member comprising a yoke member, and a plurality of main pole-pieces; a rotor member comprising an armature core separated from the main pole-pieces by air gaps; shunt coils and cumulative series coils for exciting the main pole-pieces; and separate-excitation means for exciting the shunt coils so as to produce, at times, excitation for approximately full-voltage operation, and at other times excitation for approximately half-voltage operation; each main pole-piece having a pole-face with a tapered air gap, and each main pole-piece having a first pole-face tip in which the armature reaction produces a cumulative magnetomotive force and a second pole-face tip in which the armature reaction produces a differential magnetomotive force; the large end of the tapered air gap being at the first tip; the first tip being of sufficient cross-section to be substantially unsaturated for all currents up to full-load-currents at excitation for approximately full-voltage operation; the second tip being of such restricted cross-section as to be substantially saturated for all currents up to beyond full-load-currents when the shunt coils are excited at excitation for approximately full-voltage operation, but being substantially unsaturated at excitation for approximately half-voltage operation, whereby the generator has a drooping voltage-characteristic substantially throughout the range from no-load to full-load during excitation for substantially full-voltage operation, and whereby the rising tendency of the voltage-characteristic at half-voltage operation is limited; and the cumulative series coils having approximately the correct number of turns to compensate for the armature-resistance drop and the droop in the speed-characteristic.

6. A power-plant comprising: a prime-mover having a slightly drooping speed-characteristic with increasing loads; and a self-regulating direct-current commutator-type generator; said generator comprising: a field member comprising a yoke member, a plurality of main pole-pieces and a plurality of interpole-pieces; a rotor member comprising an armature core separated from the main pole-pieces and interpole-pieces by air gaps; shunt coils and cumulative series coils for exciting the main pole-pieces; series-connected interpole-coils for exciting the interpole-pieces; and means for exciting the shunt coils so as to produce, at times, excitation for approximately full-voltage operation, and at other times excitation for approximately half-voltage operation; each main pole-piece having a pole-face with a tapered air gap, and each main pole-piece having a first pole-face tip in which the armature reaction produces a cumulative magnetomotive force and a second pole-face tip in which the armature reaction produces a differential magnetomotive force; the large end of the tapered air gap being at the first tip; the first tip being of sufficient cross-section to be substantially unsaturated for all currents up to full-load-currents at excitation for approximately full-voltage operation; the second tip being of such restricted cross-section as to be substantially saturated for all currents up to beyond full-load-currents when the shunt coils are excited at excitation for approximately full-voltage operation, but being substantially unsaturated at excitation for approximately half-voltage operation, whereby the generator has a drooping voltage-characteristic substantially throughout the range from noload to full-load during excitation for substantially full-voltage operation, and whereby the rising tendency of the voltage-characteristic at half-voltage operation is limited; and the cumulative series coils having approximately the correct number of turns to compensate for the armature-resistance drop and the droop in the speed-characteristic.

ALBERT W. KIMBALL.